United States Patent [19]
Jager et al.

[11] 3,870,726
[45] Mar. 11, 1975

[54] DERIVATIVES OF 3-AZOLYLPROPYNE AND PROCESSES FOR THEIR PREPARATION AND USE

[75] Inventors: Gerhard Jager; Manfred Plempel; Karl Heinz Buchel, all of Wuppertal-Elberfeld, Germany

[73] Assignee: Farbenfabriken Bayer Aktiengesellschaft, Leverkusen, Germany

[22] Filed: Apr. 6, 1973

[21] Appl. No.: 348,581

Related U.S. Application Data

[63] Continuation of Ser. No. 177,843, Sept. 3, 1971, abandoned.

[30] Foreign Application Priority Data

Sept. 9, 1970 Germany............................ 2044621

[52] U.S. Cl.......... 260/309, 424/273, 260/247.5 R, 260/268 H, 260/293.69, 260/308 R, 260/310 R, 260/618 R
[51] Int. Cl............................................ C07d 49/36
[58] Field of Search.................................... 260/309

[56] References Cited
FOREIGN PATENTS OR APPLICATIONS
1,486,817   5/1967   France................................ 260/309

OTHER PUBLICATIONS
Hubert, et al., J. Chem. Soc. (C), 1968, pages 606 to 608.

Primary Examiner—John D. Randolph

[57] ABSTRACT

3-phenyl-3-azolylpropynes bearing a lower alkyl or aryl group in the 3-position and optionally substituted in the 1-position by halogeno, lower alkyl, aryl or certain substituted lower alkyl groups are prepared by treating the corresponding 3-hydroxypropyne with a thionyl bisazole. Certain of the 1-substituted compounds can be prepared through substitution reactions utilizing the lithium salt. The compounds and their salts, of which 3,3-diphenyl-3-[imidazolyl-(1)]-propyne is a typical embodiment, are antimycotic agents and can be employed alone or in the form of pharmaceutical compositions in the treatment of mycotic infections in animals.

24 Claims, No Drawings

DERIVATIVES OF 3-AZOLYLPROPYNE AND PROCESSES FOR THEIR PREPARATION AND USE

This is a continuation of application Ser. No. 177,843 filed Sept. 3, 1971, now abandoned.

The present invention relates to new 3-azolylpropynes and their salts, to processes for their production and pharmaceutical and veterinary use as antimycotics, and to compositions adapted for such use.

In particular, the present invention pertains to new 3-azolylpropynes of the formula:

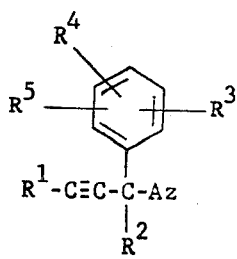

in which:
R$^1$ is a hydrogen, chloro, bromo, iodo, lower alkyl, aryl, aryloxyloweralkyl, arylthioloweralkyl, arylaminoloweralkyl, arylloweralkylaminoloweralkyl, loweralkoxyloweralkyl, loweralkylmercaptoloweralkyl, loweralkylaminoloweralkyl or diloweralkylaminoalkyl group, in which diloweralkylamino group, the loweralkyl groups can be linked together directly or through a further heteroatom so as to form, together with the nitrogen atom to which they are attached, a 5-, 6-or 7-membered heterocyclic ring;

R$_2$ is loweralkyl, cycloalkyl, cycloalkenyl, or aryl; R$^3$, R$^4$ and R$^5$, which can be the same or different, are each hydrogen, loweralkyl, loweralkoxy, loweralkylthio or an electronegative substituent; and Az is an optionally substituted nitrogen-containing five-membered heterocyclic group;

and the physiologically acceptable acid addition salts thereof.

The term "lower alkyl" denotes a straight or branched chain monovalent hydrocarbon group of from 1 to 6 carbon atoms; e.g., methyl, ethyl, n-propyl, isopropyl, n-butyl, isobutyl, sec.-butyl, tert.-butyl, n-pentyl, neopentyl, n-hexyl, etc. The term "lower alkoxy" refers to a lower alkyl group bound to the remainder of the molecule through an oxygen ether group; e.g., methoxy, ethoxy, n-propoxy, isopropoxy, butoxy and the like, while "lower alkylthio" refers to a lower alkyl group bound to the remainder of the molecule through a sulfur atom.

The term "halogeno" denotes fluoro, chloro, bromo and iodo.

The term "aryl" denotes an aromatic carbocyclic ring of 6 or 12 carbon atoms and specifically includes such systems whether unsubstitited or substituted by a substituent selected from the group consisting of halogeno, trifluoromethyl, nitro, lower alkyl, lower alkoxy, lower alkylthio, lower alkylsulfinyl or lower alkylsulfonyl. The preferred aryl group is phenyl, either unsubstituted or substituted by chloro, bromo, nitro or lower alkyl.

Electronegative substituents denote the halogens, nitro, trifluoromethyl, nitrite, lower alkylsulfinyl and lower alkyl-sulfonyl groups.

The azolyl groups designated above by "Az" are optionally substituted nitrogen-containing, five-membered rings which can be diagrammatically depicted by the formula:

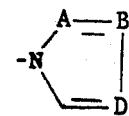

wherein one of A and B is lower alkylidyne, preferably methine, and the other of A and B is nitrogen and D is lower alkylidyne, preferably methine, or nitrogen.

Thus embraced are pyrazolyl, imidazolyl, 1,3,4-triazolyl and 1,2,4-triazole, unsubstituted or substituted by one or more alkyl groups. Preferred of these are the unsubstituted imidazolyl and 1,2,4-triazolyl.

A preferred class of compounds falling within the foregoing group of compounds depicted by formula (1) are those wherein:

R$^1$ is hydrogen, chloro, bromo, iodo, aryl, lower alkyl or substituted lower alkyl in which the substituent is lower alkoxy, lower alkylthio, aryloxy, arylthio or amino of the formula:

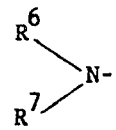

in which R$^6$ and R$^7$ are each, independent of the other, hydrogen, lower alkyl or aryl, or when taken together with the nitrogen atom to which they are attached, a 5-or 6-membered saturated nitrogen-containing heterocyclic ring; R$^2$ is lower alkyl or aryl;

each of R$^3$, R$^4$ and R$^5$ is hydrogen, halogeno, trifluoromethyl, nitro, lower alkyl, lower alkoxy, lower alkylthio, lower alkyl-sulfinyl or lower alkylsulfonyl;

Az is a 5-membered heterocyclic ring unsubstituted or substituted by up to three lower alkyl groups; and the physiologically acceptable acid addition salts thereof.

Within this group of compounds the following three sub-classes may be especially noted:

a. those of the formula:

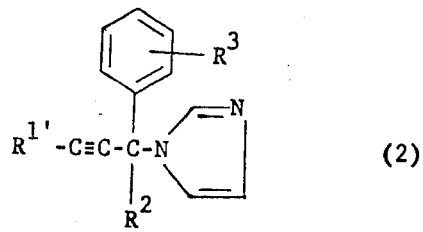

wherein
R$^1$ is hydrogen, chloro, bromo, iodo, lower alkyl, or aryloxy(lower alkyl);
R$^2$ is lower alkyl or phenyl;
R$^3$ is hydrogen, halogeno, trifluoromethyl, nitro, lower alkyl or lower alkoxy;

b. those of the formula:

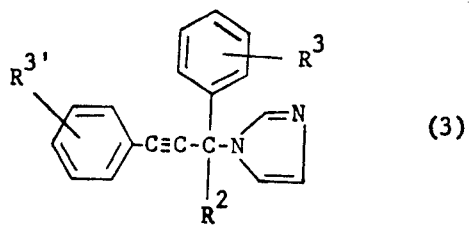

wherein $R^2$ is lower alkyl or phenyl and each of $R^3$ and $R^3$, independent of the other, is hydrogen, halogeno, trifluoromethyl, nitro, lower alkyl or lower alkoxy; and c. those of the formula

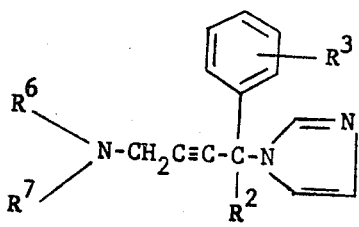

(4)

wherein $R^2$ is lower alkyl or phenyl;

$R^3$ is hydrogen, halogeno, trifluoromethyl, nitro, lower alkyl or lower alkoxy;

$R^6$ and $R^7$ are each, independent of the other, hydrogen or lower alkyl or, when taken together with the nitrogen atom to which they are attached, a 5- or 6-membered saturated nitrogen-containing heterocyclic ring.

In the compounds of Formula (4), the amino group includes unsubstituted amino, mono(lower alkyl)amino, di(lower alkyl)amino, and heterocyclic amino. The heterocyclic groups are those of 5- to 6-ring members, one of which is nitrogen through which the group is bound to the remainder of the molecule, such as pyrrolidino, piperidino, morpholino, piperazino and N-lower-alkylpiperazino.

Salts of the compounds of Formula (1) are those which are pharmaceutically acceptable, i.e., derived from physiologically tolerated acids. Examples of such acids are the mineral acids such as hydrohalic acids, especially hydrochloric acid hydrobromic acid, phosphoric acids, nitric acid and monofunctional and bifunctional carboxylic organic acids such as acetic acid, maleic acid, succinic acid, fumaric acid, tartaric acid, citric acid, salicyclic acid, sorbic acid, lactic acid, 1,5-naphthalene-disulphonic acid and the like.

Some of the compounds according to the invention are listed below by way of examples:

1. 1,3,3-Triphenyl-3-[imidazolyl-(1)]-propyne
2. 1,3-Diphenyl-3-(4-chlorophenyl)-3-[imidazolyl-(1)]-propyne
3. 1,3-Diphenyl-3-(2-chlorophenyl)-3[imidazolyl-(1)]-propyne
4. 1,3-Diphenyl-3-(3-nitrophenyl)-3-[imidazolyl-(1)]-propyne
5. 1,3-Diphenyl-3-(2-methylphenyl)-3-[imidazolyl-(1)]-propyne
6. 1,3-Diphenyl-3-(3-methylphenyl)-3-[imidazolyl-(1)]-propyne
7. 1,3-Diphenyl-3-[imidazolyl-(1)]-butyne
8. 1,3-Diphenyl-4,4-dimethyl-3-[imidazolyl-(1)]-pentyne
9. 3,3-Diphenyl-3-[imidazolyl-(1)]-propyne
10. 3-Phenyl-3-(3-methylphenyl)-3-[imidazolyl-(1)]-propyne
11. 3-Phenyl-3-[imidazolyl-(1)]-butyne
12. 3-Phenyl-4-methyl-3-[imidazolyl-(1)]-pentyne
13. 1,1-Diphenyl-1-[imidazolyl-(1)]-octyne-(2)
14. 1-(2-Ethylphenoxy)-4-phenyl-4-[imidazolyl-(1)]-pentyne-(2)
15. 1,1-Diphenyl-4[pyrrolidinyl-(1)]-1-[imidazolyl-(1)]-butyne-(2)
16. 1,1-Diphenyl-4-morpholino-1-[imidazolyl-(1)]-butyne-(2)
17. 1,1-Diphenyl-4-[N,N-diethylamino]-1-[imidazolyl-(1)]-butyne-(2)
18. 1-Bromo-3,3-diphenyl-3-[imidazolyl-(1)]-propyne
19. 1-Iodo-3,3-diphenyl-3-[imidazolyl-(1)]-propyne The present invention also provides three processes, designated as (a), (b) and (c), for the production of these new 3-azolylpropynes and their salts.

Process (a) comprises allowing an alcohol of the formula:

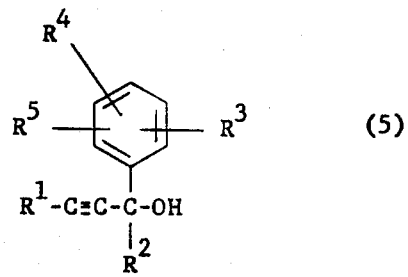

(5)

to react with a thionyl-bis-azole of the general formula:

AZ-SO-Az (6)

in which $R^1$, $R^2$, $R^3$, $R^4$ and $R^5$ and Az are as defined above to produce a 3-azolyl-propyne of Formula (1) and, when a salt is desired, treating the resultant 3-azolyl-propyne with the appropriate acid.

Process (b) is applicable to those 3-azolyl-propynes and salts in which $R^1$ is lower alkyl and comprises allowing a compound of the formula:

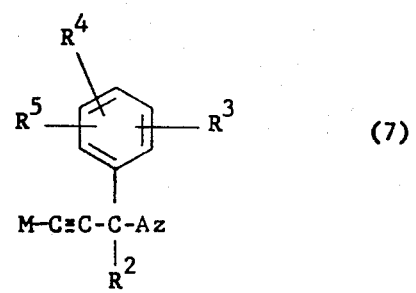

(7)

in which $R^2$, $R^3$, $R^4$ and $R^5$ and Az are as defined above; and

M is an alkali metal, for example sodium, potassium or lithium, a chloromagnesium, a bromomagnesium or an iodomagnesium radical to react with a lower alkyl chloride, bromide or iodide and decomposing by the addition of water any complex formed, to produce a 3-azolylpropyne of Formula (1) wherein $R^1$ is lower alkyl, and, when desired, converting the resultant 3-azolylpropyne to a salt.

Process (c) is applicable to the 3-azolylpropynes and salts of the invention in which $R^1$ is chloro, bromo or iodo, and comprises reacting a compound of Formula (7) with the appropriate hypohalous acid in a solvent at a temperature of from 0° to 120°C, to produce a 3-azolylpropyne of Formula (1) wherein $R^1$ is chloro, bromo or iodo and, when desired, converting the resultant 3-azolylpropyne to a salt.

In process (a), the reactants are generally allowed to react in approximately molar amounts in an inert organic solvent as for example aromatic hydrocarbons such as benzene and toluene; ethers such as diethyl ether and tetrahydrofuran; halogenated hydrocarbons such as chloroform and carbon tetrachloride, and lower alkylnitriles such as acetonitrile. Acetonitrile is a particularly preferred solvent. The reaction is generally carried out at temperatures of from 0° to 120°C, preferably at temperatures of from 20° to 80°C. A preferred embodiment of process (a) is therefore to allow the alcohol and thionyl-bis-azole in approximately molar amounts to react in acetonitrile as solvent at 20° to 80°C.

In process (b), the reactants are generally employed in approximately stoichiometrically required amounts and allowed to react in an inert organic solvent. The compound of the general Formula (7) is preferably freshly produced and not isolated before reaction with the lower alkyl halide. Suitable solvents include for example aromatic hydrocarbons such as benzene and toluene, aliphatic hydrocarbons such as pentane and hexane, and ethers such as diethyl ether and tetrahydrofuran, including mixtures of these solvents. Diethyl ether and hexane and particularly preferred solvents. The reaction is generally carried out at temperatures of −30° to 102°C, preferably at temperatures of −10° to 80°C.

A preferred embodiment of process (b) is therefore to allow the compound of Formula (7) and the lower alkyl halide to react in substantially stoichiometric amounts in diethyl ether or hexane as solvent at a temperature of −10° to +80°C.

In process (c), the reaction between the compound of Formula (7) and the hypohalous acid is expediently carried out in a polar solvent as for example water, pyridine, lower alkanol such as methanol and ethanol, and mixtures of these. The compound of Formula (7) and the hypohalous acid are preferably reacted in substantially molar amounts.

The compounds of the Formula (7), if not known, are preferably produced by allowing a 3-azolylpropyne prepared according to process (a) wherein $R^2$ is hydrogen to react with an alkali metal, for example, lithium, sodium and potassium, with the hydroxide of the alkali metal, or with a lower alkyllithium salt, or with a lower alkylmagnesium halide in situ in an inert solvent, preferably one of the above-mentioned solvents.

The starting compounds required for the manufacture of the new compounds by process (a) are either known or are obtainable by known processes.

The course of the processes according to the invention may be illustrated by specifics with reference to the following equations:

Equation I illustrates the production by process (a) of a 3-azolylpropyne of the invention in which $R^1$ is hydrogen. Equation II illustrates the conversion of this compound into a lithium derivative, and Equation III illustrates the conversion of this lithium derivative according to process (b) into a 3-azolylpropyne of the invention in which $R^1$ is n-pentyl.

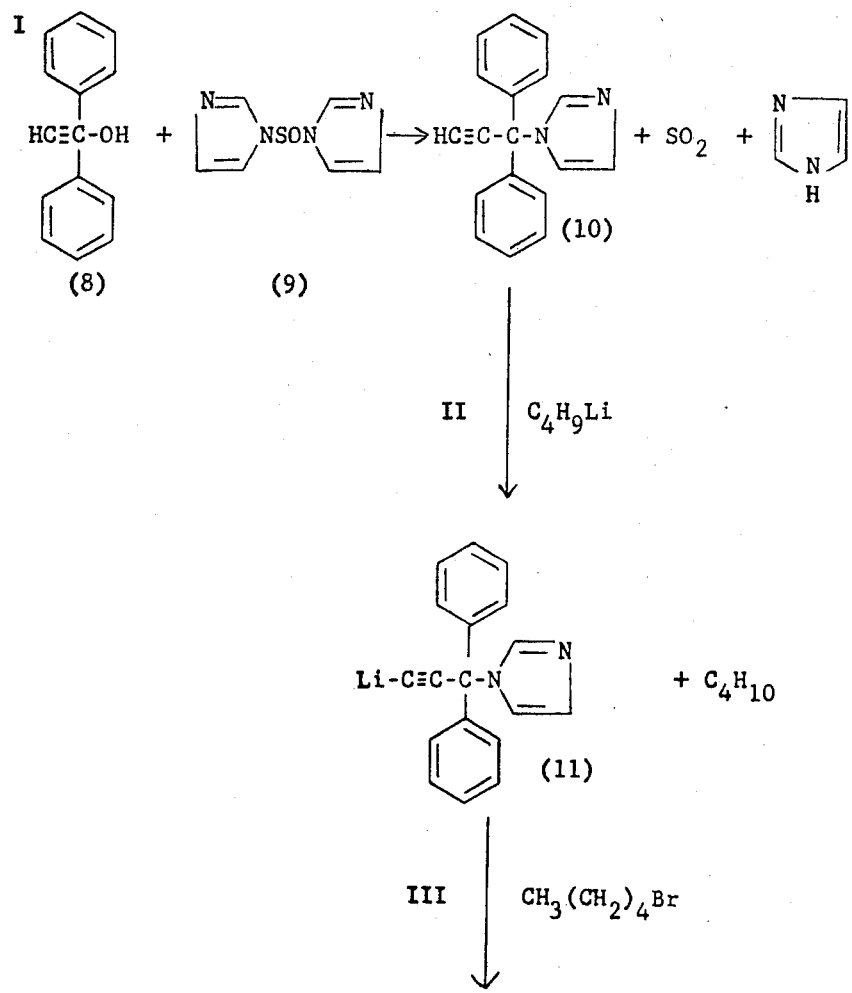

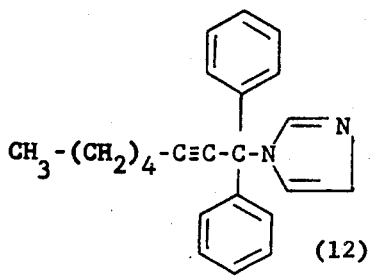

(12)

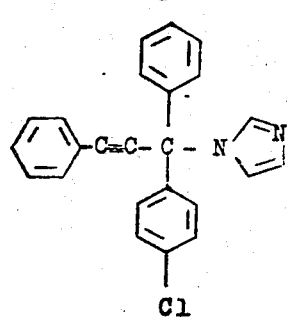

(21)

The new 3-azolylpropynes can be converted to their salts, and the free 3-azolylpropynes obtained from the salts, by any of the usual methods known to those skilled in the art. The 3-azolylpropynes and their salts are isolated and purified by methods known in the art such as crystallization, chromatography, distillation and the like.

The following examples will serve to further typify the nature of the present invention without being a limitation on the scope thereof. In these examples, temperature is given in °C.

EXAMPLE 1

1,3,3-Triphenyl-3-[imidazolyl-(1)]-propyne

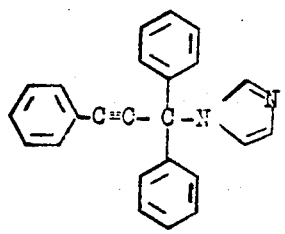

(20)

28.4 g (0.1 mol) of 1,3,3-triphenylpropynol-(3) [melting point 83°, Liebigs Ann.Chem. 308, 282 (1899)], dissolved in 200 ml of acetonitrile, are added dropwise, over the course of 10 minutes, to a solution of 18.2 g (0.1 mol) of thionyl-bis-imidazol (Angew.-Chem. 73, 26 (1961)) in 300 ml of acetonitrile at 25°.

The evolution of sulphur dioxide starts immediately. To complete the reaction, the mixture is thereafter stirred for a further 4 hours at about 80°. After cooling, the solvent is distilled off in vacuo and the residue is taken up in 300 ml of ether and thoroughly washed with water. The ether phase is dried over potassium carbonate and then treated with active charcoal, and the basic constituents are thereafter precipitated from it by mixing with hydrochloric acid in ether. The hydrochloride which separates out is subsequently taken up in 300 ml of water. To prepare the free base, about 100 ml of 20% strength sodium hydroxide solution are stirred into the aqueous solution of the hydrochloride. The product which separates out is taken up in ether, and the ether solution is dried over potassium carbonate and freed of the solvent in vacuo. After recrystallisation of the residue from ethyl acetate/petroleum ether, 1,3,3-triphenyl-3-[imidazolyl-(1)]propyne is obtained in the form of colourless crystals of melting point 103°-104°C.

The following compounds are obtained analogously to Example 1.

EXAMPLE 2

1,3-Diphenyl-3-(4-chlorophenyl)-3-[imidazolyl-(1)]-propyne.

From 1,3-diphenyl-3-(4-chlorophenyl)-propynol-(3) and thionyl-bis-imidazole in acetonitrile. Melting point 87°-87.5°.

EXAMPLE 3

1,3-Diphenyl-3-(2-chlorophenyl)-3-[imidazolyl-(1)]-propyne.

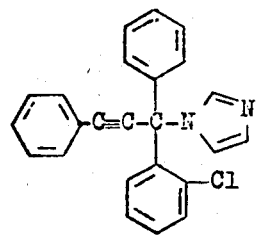

(22)

From 1,3-diphenyl-3-(2-chlorophenyl)-propynol-(3) and thionyl-bis-imidazole in acetonitrile. Melting point 50°-53°C.

EXAMPLE 4

1,3-Diphenyl-3-(3-nitrophenyl)-3-[imidazolyl-(1)]-propyne.

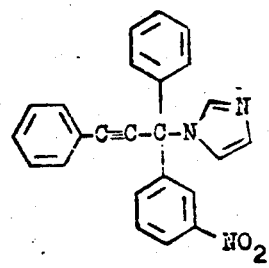

(23)

From 1,3-diphenyl-3-(3-nitrophenyl)-propynol-(3) and thionyl-bis-imidazole in acetonitrile. Melting point 44°-46°C.

EXAMPLE 5

1,3-Diphenyl-3-(2-methylphenyl)-3-[imidazolyl-(1)]-propyne.

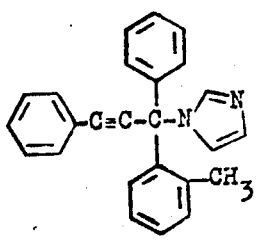

(24)

From 1,3-diphenyl-3-(2-methylphenyl)-propynol-(3) and thionyl-bis-imidazole in acetonitrile. Melting point 46°-48°.

EXAMPLE 6

1,3-Diphenyl-3-(3-methylphenyl)-3-[imidazolyl-(1)]-propyne.

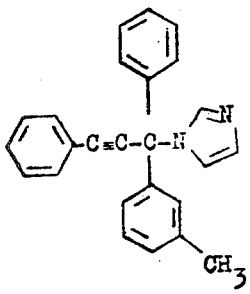 (25)

A freshly prepared solution of 36.4 g (0.2 mol) of thionyl-bis-imidazole in 300 ml of acetonitrile is introduced into a solution of 59.6 g (0.2 mol) of 1,3-diphenyl-3-methylphenyl)-propynol-(3) in 200 ml of acetonitrile. The reaction mixture is stored for 6 days at room temperature with exclusion of moisture and is subsequently freed of the solvent in vacuo. The oil residue which remains is taken up in 300 ml of ether, and the ether solution is thoroughly washed with water, dried over sodium suophate and mixed with hydrochloric acid in ether. The supernatant liquid is decanted from the hydrochloride which has separated out, the salt is rinsed with ether and taken up in 300 ml of water and the base is liberated by adding 20% strength sodium hydroxide solution and extracted with ethyl acetate. The oil which remains after evaporating the solution which has been dried over potassium carbonate is freed of remnants of solvents at 0.1 mm Hg and 80°C. 1,3-Diphenyl-3-(3-methylphenyl)-3-[ imidazolyl-(1)]-propyne is thus obtained as a highly viscous oil. $n_D^{30}$ 1.6294.

To prepare the hydrochloride, dry halogen chloride is passed into a solution of 12 g of the base in 100 ml of anhydrous ether at 0°. Thereafter the supernatant liquid is decanted from the oily salt produced, and the latter is again mixed with ether and triturated. 12.1 g of the hydrochloride are thus obtained in the form of colourless crystals of melting point 114°–115°.

The following are manufactured analogously to Example 6.

EXAMPLE 7

1,3-Diphenyl-3-[imidazolyl-(1)]-butyne.

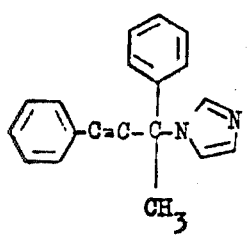 (26)

From 1,3-diphenyl-butynol-(3) [Liebigs Ann.Chem. 308, 281 (1899)] and thionyl-bis-imidazole in acetonitrile. Oil, $n_D^{25}$ 1.6113.

EXAMPLE 8

1,3-Diphenyl-4,4-dimethyl-3-[imidazolyl-(1)]-pentyne.

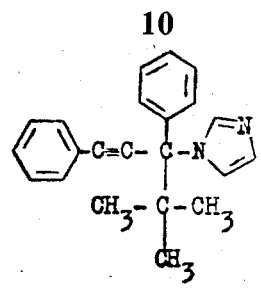 (27)

From 1,3-diphenyl-4,4-dimethyl-pentynol-(3) (28) and thionyl-bis-imidazole in acetonitrile. Viscous oil, $n_D^{25}$ 1.6019.

The carbinol (28) required as the starting material is obtained as follows:

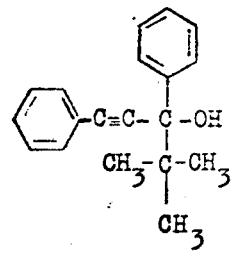 (28)

11.5 g of metallic sodium are introduced into a solution of 51 g (0.5 mol) of phenylacetylene in 200 ml of dry ether. The mixture is stirred at room temperature until the evolution of hydrogen has ceased (approx. 4 hours). Thereafter a solution of 81.1 g (0.5 mol) of phenyl tert.-butyl ketone in 200 ml of ether is added dropwise to the ether suspension of the sodium phenylacetylide, with vigorous stirring. The mixtures is further stirred overnight and hydrolysed with dilute sulphuric acid, and the ether phase is separated off, washed with water, dried over sodium sulphate and evaporated in vacuo. Recrystallisation of the residue from petroleum ether yields 1,3-diphenyl-4,4-dimethyl-pentynol-(3) in the form of colourless crystals of melting point 65°–66°.

EXAMPLE 9

3,3-Diphenyl-3-[imidazolyl-(1)]-propyne.

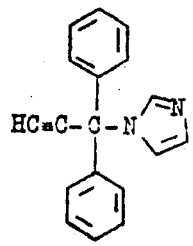 (17)

From 3,3-diphenyl-propynol-(3) [melting point 45°–46°, J.Amer.Chem.Soc. 83 4990 (1961)] and thionyl-bis-imidazole in acetonitrile, in the form of colourless crystals of melting point 136°(acetonitrile).

EXAMPLE 10

3-Phenyl-3-(3-methylphenyl)-3-[imidazolyl-(1)]-propyne.

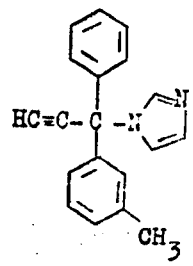 (29)

From 3-phenyl-3-(3-methylphenyl)-propynol-(3) and thionyl-bis-imidazole in acetonitrile, as colourless crystals of melting point 83°–85° (petroleum ether).

EXAMPLE 11

3-Phenyl-3-[imidazolyl-(1)]-butyne.

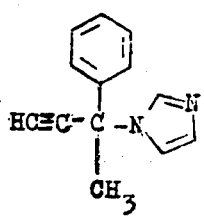   (30)

From 3-phenyl-butynol-(3) and thionyl-bis-imidazole in acetonitrile, as a non-distillable oil. $n_D^{25}$ 1.5753.

EXAMPLE 12

3-Phenyl-4-methyl-3-[imidazolyl-(1)]-pentyne.

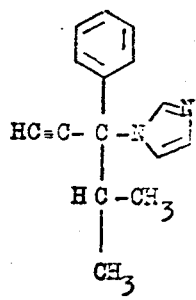   (31)

From 3-phenyl-4-methyl-pentynol-(3) (32) and thionyl-bis-imidazole in acetonitrile, as a non-distillable oil. $n_D^{25}$ 1.5715.

The carbinol (32) required as the starting material is produced as follows:

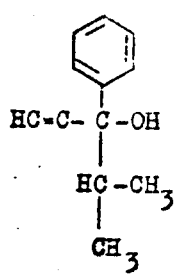   (32)

148.2 g (1 mol) of phenyl isopropyl ketone, dissolved in 300 ml of N,N-dimethylformamide, are stirred into a solution of 144 g. (3 mols) of sodium acetylide in 2000 ml of N,N-dimethylformamide [Angew. Chem. 71, 245 (1959)] over the course of 30 minutes. After 12 hours the mixture is hydrolysed with 1000 ml of 20% strength sulphuric acid, whilst cooling externally with ice water. The hydrolysed product is brought to a total volume of 10 litres with water and is subsequently extracted with 2 × 1,000 ml of ether. The residue which remains after concentrating the ether phase which has been dried over sodium sulphate, on distillation yields 3-phenyl-4-methyl-pentynol-(3) as a colourless oil of boiling point 117°–120°/6 mm Hg.

EXAMPLE 13

1,1-Diphenyl-1-[imidazolyl-(1)]-octyne-(2).

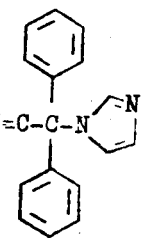   (19)

a. From 1,1-diphenyl-octyne-(2)-ol (boiling point 160°–165°/0.5 mm Hg) and thionyl-bis-imidazole in acetonitrile, analogously to Example 6, as a viscous oil. $n_D^{25}$ 1.5755.

b. A solution of 1.9 g (0.03 mol) of n-butyl-lithium in hexane is added dropwise, at room temperature, to a solution of 5.16 g (0.02 mol) of 3,3-diphenyl-3-[imidazolyl-(1)]-propyne [Example 9; (17)] in 300 ml of ether, after 3 hours the reaction mixture is treated with a solution of 4.53 g (0.03 mol) of n-pentyl bromide and stirred for a further 2 hours at room temperature, the product is hydrolysed with dilute sulphuric acid and the organic phase is worked up in the usual manner.

EXAMPLE 14

1-(2-Ethylphenoxy)-4-phenyl-4-[imidazolyl-(1)]-pentyne-(2).

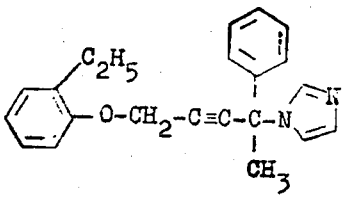   (33)

From 1-(2-ethylphenoxy)-4-phenyl-pentyne-(2)-ol-(4) and thionyl-bis-imidazole in acetonitrile, as a viscous oil. $n_D^{25}$ 1.5852.

EXAMPLE 15

1,1-Diphenyl-4-[pyrrolidinyl-(1)]-1-[imidazolyl-(1)]-butyne-(2).

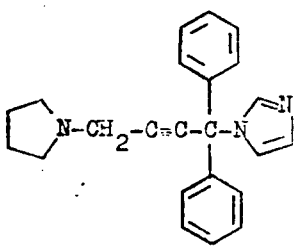   (33)

From 1,1-diphenyl-4-[pyrrolidinyl-(1)]-butyne-(2)-ol [melting point 151°–152°; Bull. Soc. chim. France, 1969, 911] and thionyl-bis-imidazole in acetonitrile, as colourless crystals of melting point 66°-68°C.

EXAMPLE 16

1,1-Diphenyl-4-morpholino-1-[imidazolyl-(1)]-butyne-(2).

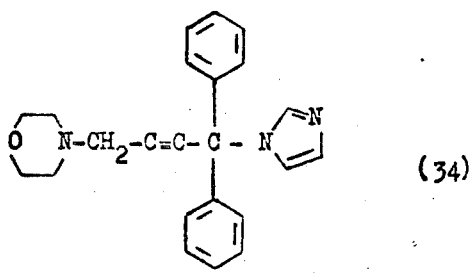

(34)

From 1,1-diphenyl-4-morpholino-butyne-(2)-ol (35) and thionyl-bis-imidazole in acetonitrile, as colourless crystals of melting point 63°-64° (ether). The carbinol (35) required as the starting material is produced as follows:

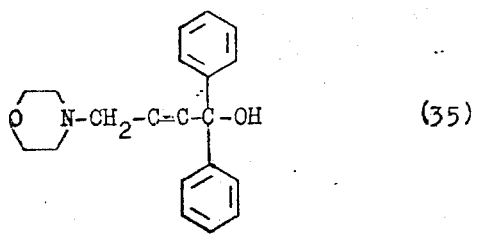

(35)

A solution of 28 g (0.44 mol) of n-butyl-lithium in 200 ml of hexane is added dropwise at −20° to −30°C whilst stirring, to a solution of 33.5 g (0.45 mol) of propargyl chloride in 200 ml of dry ether. The mixture is stirred for a further 10 minutes at this temperature and thereafter a solution of 63.7 g (0.35 mol) of benzophenone in 250 ml of ether is added dropwise over the course of 45 minutes.

After warming to room temperature, the mixture is stirred for a further 2 hours and hydrolysed with 200 ml of 20% strength sulphuric acid whilst cooling with ice, and the ether phase is separated off, dried over sodium sulphate and concentrated in vacuo. The residue is mixed with 180 ml (2.1 mols) of morpholine whilst stirring. After completion of the strongly exothermic reaction, the mixture is stirred in 1,000 ml of water and the crystals which separate out are filtered off, repeatedly washed with water and dried in vacuo. After recrystallisation from acetonitrile, 1,1-diphenyl-4-morpholino-butyne-(2)-ol is obtained as colourless crystals of melting point 150°-151°.

EXAMPLE 17

1,1-Diphenyl-4N,N-diethylamino)-1-[imidazolyl-(1)]-butyne-(2).

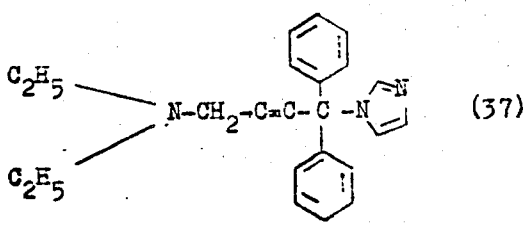

(37)

From 1,1-diphenyl-4-(N,N-diethylamino)-butyne-(2)-ol (melting point 94.5°-95°) and thionyl-bis-imidazole in acetonitrile, as colourless crystals of melting point 83°-84°.

EXAMPLE 18

1-bromo-3,3-diphenyl-3-[imidazolyl-(1)]-propyne.

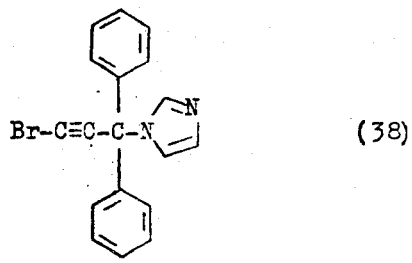

(38)

a. From 1-bromo-3,3-diphenyl-propynol-(3) and thionyl-bis-imidazole in acetonitrile as slightly yellow-coloured crystals of m.p. 186.5°-187°C.

b. To a solution (prepared at 0°-5°) of 2.75 ml (55 mols) bromine in 37.5 ml 12% solution of sodium hydroxide there is added dropwise at room temperature solution of 12.9 g (50 mols) 3,3-diphenyl-1-[imidazolyl-(1)]-propyne [Examples 9 formula (17)] in 50 ml pyridine in the course of 20 minutes. The reaction mixture heats up to 40°C. After 3 hours the reaction mixture is cooled to 20°C. and poured into 1,000 ml of water. The precipitate is filtered off with suction. The precipitate is stirred with 60 ml acetonitrile at 25°-30°C, then filtered off under suction and washed with ether. There are thus obtained 33.3 g (79% of theory) 1-bromo-3,3-diphenyl-3-[imidazolyl-(1)]-propyne of m.p. 186.5°-187°C.

EXAMPLE 19

1-iodo-3,3-diphenyl-3-[imidazolyl-(1)]-propyne.

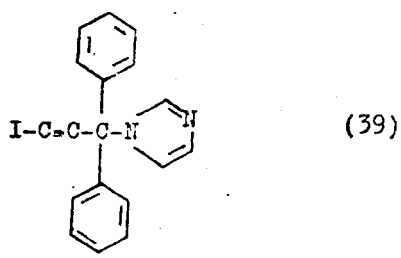

(39)

a. From 1-iodo-3,3-diphenyl-propynol-(3) and thionyl-bis-imidazole in acetonitrile as colourless crystals of m.p. 198°–199°C (decomposition).

b. To a solution of 12.9 g (50 mols) 3,3-diphenyl-3-[imidazolyl-(1)]-propyne [Example 9, formula (17)] in 100 ml methanol there are added dropwise, between 20° and 30°, 25 ml 10N aqueous sodium hydroxide and, simultaneously, 12.7 g (50 mols) of iodine are introduced in portions. The mixture is then stirred for 1 hour at room temperature, and crystalline precipitate is filtered off with suction, and stirred with 60 ml acetonitrile at 25°–30°. There are obtained in this way 15.6 g (81 % of the theory) 1-iodo-3,3-diphenyl-[imidazolyl-(1)]-propyne of m.p. 198°–199°C. (decomposition).

EXAMPLE 20

3,3-diphenyl-3-[imidazolyl-(1)]-propyne-nitrate.

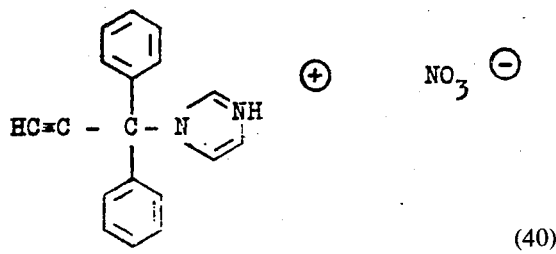

(40)

To a solution of 25.8 g (0.1 mol) 3,3-diphenyl-3-[imidazolyl-(1)]-propyne [Example 9, formula (17)] in 100 ml chloroform there are gradually added dropwise 7 ml 95% nitric acid dissolved in 25 ml chloroform. The sediment precipitated after dilution with ether is recrystallised from acetonitrile. There are so obtained 24.9 g (77.5 % of theory) of the salt of m.p. 146°–147°C.

EXAMPLE 21

3,3-diphenyl-3-[imidazolyl-(1)]propyne, 1,5-naphthalenedisulphonate.

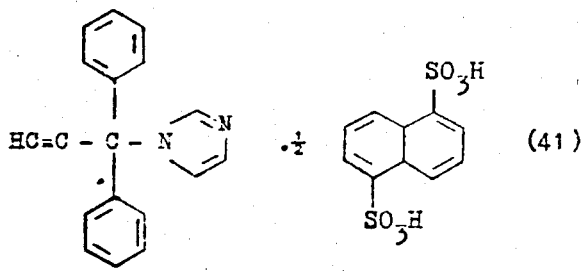

(41)

To a solution of 25.8 g (0.1 mol) 3,3-diphenyl-3-[imidazolyl-(1)]-propyne [Example 9 formula (17)] in 100 ml N hydrochloric acid there are added 33.2 g (0.1 mol) of the disodium salt of 1,5-naphthalenedisulphonic acid dissolved in 150 ml of water. The precipitate is filtered off with suction and recrystallised from 800 ml ethanol. There are so obtained 29 g (72.2 % of theory) of the salt of m.p. 180°–181°C.

As already mentioned, the new 3-azolylpropynes and their salts show an excellent antimycotic activity. This can be conveniently observed in in vitro and in vivo models of which the experiments described below are representative.

In vitro and in vivo the preparations show a surprisingly good and broad activity against human and animal pathogenic fungi, which extends both to dermatophytes and other mycelium fungi, and also to gemmiparous fungi, yeasts and biphase fungi.

1. Antimycetic action in vitro:

The table summarizes the minimum inhibitory concentrations of the preparations against various species of fungi. The MIC is determined in the series dilution test; the nutrient media were a. Sabourand's test medium for dermatophytes, Aspergilli, Penicillia and biphase fungi b. Meat extract-glucose bouillon for yeasts and gemmiparous fungi.

The incubation temperature was 28°C, and the duration of incubation 24–96 hours.

Tables 1 and 1a: minimum inhibitory concentration in γ/ml against various species of fungi.

Table 1:

| Compound from Example No. | (1) | (2) | MIC in γ/ml in the case of Candida albicans (3) | | (4) | (5) | (6) |
|---|---|---|---|---|---|---|---|
| 1 | <1 | 1 | 1 | 4 | 4 | 4 | 1 |
| 2 | 4 | 1 | 1 | 20 | 4 | 100 | 4 |
| 3 | <1 | 1 | 1 | 4 | 4 | 40 | 4 |
| 4 | 2 | <1 | 4 | 4 | 40 | 100 | 100 |
| 5 | <1 | <1 | 1 | 20 | 20 | 4 | 10 |
| 6 | <1 | <1 | 1 | <1 | 20 | 10 | 4 |
| 7 | <1 | <1 | 4 | 4 | 10 | 4 | 10 |
| 8 | <1 | <1 | 1 | <1 | 4 | <1 | 4 |
| 9 | <1 | <1 | 4 | <1 | <1 | <1 | 40 |
| 10 | <1 | 4 | 1 | 4 | <1 | <1 | 4 |
| 11 | 4 | 1 | 20 | 20 | 40 | 100 | — |
| 12 | <1 | <1 | 4 | <1 | <1 | 4 | 10 |
| 13 | <1 | 1 | 1 | 20 | <1 | <1 | 1 |
| 14 | <1 | 1 | 10 | <1 | 10 | <1 | 10 |
| 15 | 10 | 4 | 10 | 4 | 40 | 100 | 4 |
| 16 | 4 | 4 | 10 | 100 | — | — | — |
| 17 | 10 | <1 | 10 | <1 | — | 10 | — |

(1) Trichophyton mentagrophytes;
(2) Histoplasma capsulatum;
(3) Microsporon felineum;
(4) Aspergillus niger;
(5) Penicillium commune;
(6) Saprolegnia parasitica.

Table 1a

| Compound from Example | (1) with | (1) without serum | Candida albicans with | Candida albicans without serum | (3) with | (3) without serum | (4) with | (4) without serum | (5) with | (5) without serum |
|---|---|---|---|---|---|---|---|---|---|---|
| 18 | 1 | <1 | 10 | 1 | — | <1 | 100 | <1 | — | <1 |
| 19 | 1 | <1 | 10 | 1 | — | <1 | 4 | 1 | — | 10 |
| 20 | 1 | <1 | 10 | 1 | — | <1 | 4 | <1 | — | <1 |
| 21 | 1 | <1 | 100 | 10 | — | <1 | 4 | <1 | — | <1 |

MIC in γ/ml

The preparations have a primarily fungistatic action; fungicidal effects with reduction of the inoculum by 90% in 24 hours are achievable with concentrations corresponding to four times the MIC. The preparations are only slightly weakened in their activity by adding 30% of cattle serum to the nutrient medium; that is to say protein bonding and protein inactivation are slight.

2. Antimycotic action in vivo a. Experimental candidosis of white mice:

Male mice, weighing 20–22 g, of the $CF_1$–SPF strain (pellet fodder and water ad libitum) are each infected with $1 \times 10^6$ Candida albicans cells from a 24 hour old culture, by intravenous injection into the vein of the tail. In the case of untreated control animals, the infection leads to uremia through multiple abscess formation in the kidneys, and to death 4–5 days after infection. If mice infected in this way are treated orally with the preparations mentioned, significant increases in survival rate can be observed. Thus, 3,3-diphenyl-3-[imidazolyl-(1)] propyne in a dose of $2 \times 25$ to $2 \times 75$ mg/kg of body weight administered orally by means of an oesophagal probe twice daily produces the following average number (6 experiments) of surviving animals on the 6th day after infection:

14 out of 20 mice at a dose of $2 \times 25$ mg/kg
19 out of 20 mice at a dose of $2 \times 50$ mg/kg
20 out of 20 mice at a dose of $2 \times 75$ mg/kg Upon oral adminstration of the compounds of Examples 18, 19, 20 and 21 in dosages of 50 to 120 mg/kg body weight twice daily, 16 to 20 out of 20 mice similarly survived on the sixth day after infection.

By contrast, in the control group, only 2 out of 20 mice survived.

b. Experimental trichophytosis in mice caused by *Trichophyton quinckeanum*:

Male mice of the $CF_1$-SPF strain, weighing 20–22 g, are infected on the shorn, non-scarified, back with a suspension of spores of *Trichophyton quinckeanum*. Within 10 days after infection, a dermatomycosis, with the formation of typical scutula, develops at the point of infection in untreated control animals. If infected mice are treated daily, starting on the day of infection, with $2 \times 50$–75 mg of the test substances per kg of body weight, administered orally with an oesophagal probe, up to the 10th day after infection, the development of the infection can be largely or entirely suppressed. Thus with the compounds of Examples 9 and 4, 0 out of 20 animals show scutula on the 10th day after infection. Similarly with the compounds of Examples 6, 11 and 14, 2 to 6 out of 20 animals show scutula. In the untreated control group, 18 out of 20 animals had multiple scutula.

c. Local application, using the model of experimental guinea pig trichophytosis caused by *Trichophyton mentagrophytes*.

Male guinea pigs of the Pearl-bright-white race, weighing 450–600 g (pellet fodder, beetroot and water ad libitum) are infected, on the shorn back, with a suspension of spores of Trichophyton mentagrophytes. In untreated control animals, the typical dermatomycosis develops within 24–30 days, with loss of hair, reddening of skin and ulcerations at the point of infection.

The test compound is applied once daily to the point of infection, starting on the 4th day after infection up to the 15th day after infection, by lightly rubbing in a 1% strength solution in polyethylene glycol 400. 3,3-Diphenyl-3-[imidazolyl-(1)propyne and 1-iodo-3,3-diphenyl-3-[imidazolyl-(1)]propyne lead to a suppression of the development of the infection or to a mild course of the infection, which begins to heal between the 6th and 14th day after infection.

The new 3-azolylpropynes and their pharmaceutically acceptable salts are thus highly active antimycotics having a broad spectrum of action, and thus useful in human and veterinary medicine for dermatomycoses caused by dermatophytes, yeasts, gemmiparous fungi and mould fungi, as well as biphase fungi and chromomycetes, and organic mycoses caused by yeasts, gemmiparous fungi and mould fungi, as well as biphase fungi.

In general it has proved advantageous, especially in the case of oral administration, to administer amounts of twice 12.5 to twice 50 mg/kg of body weight per day, for a period of about 2 to 6 weeks, to achieve effective results. Nevertheless, it can at times be necessary to deviate from the amounts mentioned, and in particular to do so as a function of the body weight, of the individual behavior of the subject to be treated, of the nature of the method of administration of the medicine, the nature of its formulation and the point in time or interval at which it is administered. Thus it can in some cases suffice to use less than the above-mentioned minimum amount, while in other cases the upper limit mentioned should be exceeded. Approximately the same dosage range, on a mg/kg body weight basis, is envisaged for administration to animals in human medicine and in veterinary medicine.

The present invention provides a pharmaceutical composition containing as an active ingredient at least one of the new 3-azolylpropynes of Formula (1), or a pharmaceutically acceptable salt thereof, in admixture with a pharmaceutically acceptable solid of liquid diluent or carrier as hereinafter defined.

In the present specification the expression "pharmaceutically acceptable diluent or carrier" denotes a non-toxic substance that when mixed with the active ingredient or ingredients renders it suitable for or facilitates administration for antimycotic therapy, such as buffered aqueous solution, isotonic saline aqueous solutions, non-toxic organic solvents, such as paraffins as for example petroleum fractions; vegetable oils as for example groundnut oil and sesame oil; alcohols as for example ethyl alcohol and glycerol; glycols as for example propylene glycol and polyethylene glycol optionally in admixture with water; natural rock powders such as kaolins, aluminas, talc and chalk, synthetic rock powders such as highly disperse silica and silicates; sugars as for example unrefined sugar, lactose and glucose; cellulose and its derivatives. Examples of pharmaceutical compositions according to the invention are ointments, pastes, creams, sprays, lotions, aqueous suspensions, elixirs, syrups, granules and powders, either free-flowing or compressed into tablets.

The pharmaceutical compositions of the invention may also contain other non-toxic adjuvants and modifiers such as dyes, surfactants, for example emulsifiers, such as non-ionic and anionic emulsifiers, for example polyoxyethylene-fatty acid esters, polyoxyethylene-fatty alcohol ethers, alkylsulphonates and arylsulphonates, and dispersing agents as for example lignin and sulfite waste lyes, perfumes, flavoring agents, preservatives and biocides.

The compounds and pharmaceutically acceptable salts of the present invention may be administered per-orally, parenterally or topically.

Preferred diluents and carriers for pharmaceutical compositions adapted for oral administration include solid vehicles, excipients and lubricants such as glucose, lactose and sucrose, corn and potato starch, sodium carboxymethyl cellulose, methyl and ethyl cellulose and cellulose acetate, powdered gum tragacanth, gelatin, alginic acid, agar, stearic acid, sodium, calcium and magnesium stearates, sodium lauryl sulphate, polyvinyl-pyrrolidone, sodium citrate, calcium carbonate, and dicalcium phosphate.

Preferred carriers for parenterally administered pharmaceutical compositions include solvents and suspending diluents such as water and water-miscible organic solvents, in particular sesame oil, groundnut oil, aqueous propylene glycol, and N,N-dimethylformamide. Examples of pharmaceutical compositions of the invention are sterile isotonic saline aqueous solutions of the active ingredient, which may be buffered with a pharmaceutically acceptable buffer and are preferably pyrogen-free.

Preparations for local or topical administration expediently comprise the active compound in any suitable solvent or diluent for topical administration. An example of a pharmaceutical composition adapted for local administration is a 1 wt.% solution of a 3-azolylpropyne, or pharmaceutically acceptable salt thereof in polyethylene glycol 400.

The pharmaceutical compositions of the invention preferably contain 0.5 to 90 wt.% of the new 3-azolylpropyne of the invention or pharmaceutically acceptable salt thereof. The 3-azolylpropynes and their pharmaceutically acceptable salts may be used alone or in admixture with one or more other active ingredients.

The present invention also provides composition in dosage unit form comprising at least one 3-azolylpropyne of Formula (1), or a pharmaceutically acceptable salt thereof.

The expression "dosage unit form" as used in the present specification refers to a medicament in the form of discrete portions each containing a unit dose or a multiple or submultiple of a unit dose of the active ingredient; for example, one, two, three or four unit doses or a half, a third or a quarter of a unit dose. A "unit dose" is the amount of the active ingredient to be administered on one occasion and will usually be a daily dose, or for example a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, pyrogen-free aqueous solution.

The preferred unit dose for administration of the medicaments of the invention is 625–4,500 mg. of active ingredient for an animal of approximately 70 kg. of body weight. This will normally be administered twice daily, over a period of 2–6 weeks.

The invention further provides a method of combating mycotic infection in an animal which comprises administering to the animal (preferably parenterally, per-orally or locally) a pharmaceutical composition according to the invention or a medicament in dosage unit form according to the invention.

The new 3-azolylpropynes and their pharmaceutically acceptable salts show, in addition, the activity against human- and animal-pathogenic fungi and yeasts, activity against plant-pathogenic fungi and yeasts, and also against bacteria and protozoa, for example trypanosomes and trichomonades.

What is claimed is:

1. A compound selected from the group consisting of a 3-azolylpropyne derivative of the formula:

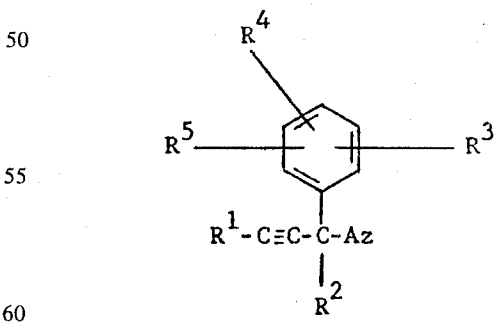

wherein
$R^1$ is hydrogen, chloro, bromo, iodo or lower alkyl;
$R^2$ is lower alkyl or phenyl;
$R_3$, $R_4$ and $R_5$ are the same or different and selected from hydrogen, halogeno, trifluoromethyl, nitro, lower alkyl or lower alkoxy but are not all identical; and
Az is imidazole linked to the adjacent carbon atom in the 1-position; or a physiologically acceptable acid addition salt thereof.

2. A compound of the formula:

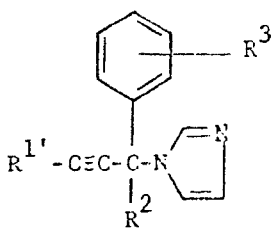

wherein

R¹ is hydrogen, chloro, bromo, iodo, lower alkyl or phenoxy (lower alkyl);

R² is lower alkyl or phenyl;

R³ is hydrogen, halogeno, trifluoromethyl, nitro, lower alkyl or lower alkoxy.

3. A compound of the formula:

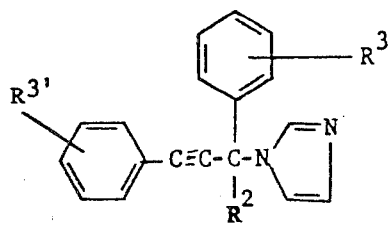

wherein

R² is lower alkyl or phenyl;

R³ is hydrogen, halogeno, trifluoromethyl, nitro, lower alkyl or lower alkoxy and R³' is hydrogen or lower alkyl.

4. A compound according to claim 3 wherein R³ is hydrogen.

5. A compound of the formula:

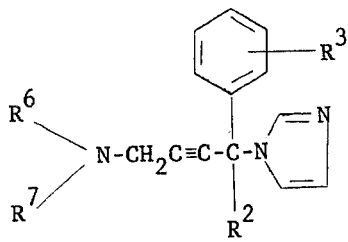

wherein

R² is lower alkyl or phenyl;

R³ is hydrogen, halogeno, trifluoromethyl, nitro, lower alkyl or lower alkoxy;

R⁶ and R⁷ are each, independent of the other, hydrogen or lower alkyl or, when taken together with the nitrogen atom to which they are attached, a 5- or 6-membered saturated nitrogen-containing heterocyclic ring, selected from the group consisting of pyrrolidino, piperidino, morpholino, piperazino and N-lower-alkylpiperazino.

6. A compound according to claim 3 wherein said 3-azolylpropyne is 1,3,3-triphenyl-3-[imidazolyl-(1)]-propyne.

7. A compound according to claim 3 wherein said 3-azolylpropyne is 1,3-diphenyl-3-(4-chlorophenyl)-3-[imidazolyl-(1)]-propyne.

8. A compound according to claim 3 wherein said 3-azolylpropyne is 1,3-diphenyl-3-(2-chlorophenyl)-3-[imidazolyl-(1)]-propyne.

9. A compound according to claim 3 wherein said 3-azolylpropyne is 1,3-diphenyl-3-(3-nitrophenyl)-3-[imidazolyl-(1)]-propyne.

10. A compound according to claim 3 wherein said 3-azolylpropyne is 1,3-diphenyl-3-(2-methylphenyl)-3-[imidazolyl-(1)]-propyne.

11. A compound according to claim 3 wherein said 3-azolylpropyne is 1,3-diphenyl-3-(3-methylphenyl)-3-[imidazolyl-(1)]-propyne.

12. A compound according to claim 3 wherein said 3-azolylpropyne is 1,3-diphenyl-3-[imidazolyl-(1)]-butyne.

13. A compound according to claim 3 wherein said 3-azolylpropyne is 1,3-diphenyl-4,4-dimethyl-3-[imidazolyl-(1)]-pentyne.

14. A compound according to claim 1 wherein said 3-azolylpropyne is 3,3-diphenyl-3-[imidazolyl-(1)]-propyne.

15. A compound according to claim 1 wherein said 3-azolylpropyne is 3-phenyl-3-(3-methylphenyl)-3-[imidazolyl-(1)]-propyne.

16. A compound according to claim 1 wherein said 3-azolylpropyne is 3-phenyl-3-[imidazolyl-(1)]-butyne.

17. A compound according to claim 1 wherein said 3-azolylpropyne is 3-phenyl-4-methyl-3-[imidazolyl-(1)]-pentyne.

18. A compound according to claim 1 wherein said 3-azolylpropyne is 1,1-diphenyl-1-[imidazolyl-(1)]-octyne-(2).

19. A compound according to claim 1 wherein said 3-azolylpropyne is 1-(2-ethylphenoxy)-4-phenyl-4-[imidazolyl-(1)]-pentyne-(2).

20. A compound according to claim 5 wherein said 3-azolylpropyne is 1,1-diphenyl-4-[pyrrolidinyl-(1)]-1-[imidazolyl-(1)]-butyne-(2).

21. A compound according to claim 5 wherein said 3-azolylpropyne is 1,1-diphenyl-4-morpholino-1-[imidazolyl-(1)]-butyne-(2).

22. A compound according to claim 5 wherein said 3-azolylpropyne is 1,1-diphenyl-4-(N,N-diethylamino)-1-[imidazolyl-(1)]-butyne-(2).

23. A compound according to claim 1 wherein said 3-azolylpropyne is 1-bromo-3,3-diphenyl-3-[imidazolyl-(1)]-propyne.

24. A compound according to claim 1 wherein said 3-azolylpropyne is 1-iodo-3,3-diphenyl-3-[imidazolyl-(1)]-propyne.

* * * * *